United States Patent [19]

Benjamin et al.

[11] Patent Number: 4,623,826
[45] Date of Patent: Nov. 18, 1986

[54] STALL PROTECTION CIRCUIT FOR BRUSHLESS MOTOR CONTROL

[75] Inventors: Kenneth A. Benjamin; Charles W. Brouwer, both of Greensboro, N.C.

[73] Assignee: John Brown Inc., Warwick, R.I.

[21] Appl. No.: 636,216

[22] Filed: Jul. 31, 1984

[51] Int. Cl.⁴ .............................................. H02P 6/02
[52] U.S. Cl. .................................... 318/254; 318/138; 318/439
[58] Field of Search ............. 242/18 R; 318/138, 254, 318/254 A, 439

[56] References Cited

U.S. PATENT DOCUMENTS

| | | | |
|---|---|---|---|
| 3,265,315 | 8/1966 | Mueller | 242/18 R |
| 3,490,707 | 1/1970 | Warshaw et al. | 242/18 R |
| 3,887,844 | 6/1975 | Yoshida | 361/98 X |
| 4,030,005 | 6/1977 | Doemen | 318/439 X |
| 4,114,819 | 9/1978 | Kanki et al. | 242/18 R |
| 4,270,074 | 5/1981 | Duckworth et al. | 318/439 X |
| 4,374,347 | 2/1983 | Muller | 318/254 X |

Primary Examiner—William M. Shoop, Jr.
Assistant Examiner—Bentsu Ro
Attorney, Agent, or Firm—Burnett W. Norton

[57] ABSTRACT

This relates to the provision of a stall shutdown circuit for a brushless direct current motor wherein energization of the windings of the stator of the motor is controlled by transistors. By providing a stall shutdown circuit for shutting down power to the transistors when a stall condition exists, the capacity of the power supply transistor may be reduced to one-third of that presently required, thereby greatly reducing the cost of the motor. The brushless direct current motor utilizing the stall shutdown circuit of the present invention is particularly useful in a textile machine such as a take-up device where it is necessary to stop a spindle to doff and don yarn packages.

28 Claims, 3 Drawing Figures

STALL PROTECTION CIRCUIT FOR BRUSHLESS MOTOR CONTROL

FIELD OF INVENTION

This invention relates to electronic control of a brushless direct current motor. More particularly, the invention relates to the use of a brushless motor on a textile machine, such as on a feeder or on a yarn take-up device.

BACKGROUND OF INVENTION

A conventional brushless direct current motor as used on a textile machine includes a three-phase wire wound stator, a permanent magnet armature, and a fixed encoder assembly coupled to the magnetic signal of the armature. The encoder assembly provides logic level signals to indicate motor armature position.

The brushless direct current motor has a power supply in the form of a power transistor switching circuit which is designed to provide current flow through the three stator windings in sequence. The direction of current flow is controlled by a signal from the encoder assembly.

The current flow through the stator windings causes an incremental rotation of the armature and the encoder, deriving a magnetic signal from the armature, which in turn causes the power circuit to switch the current flow at appropriate positions of the armature to continue the rotation of the armature. The continuous switching of current flow through the stator windings, commonly referred to as commutation, supports the rotation of the motor armature. This is similar to a conventional direct current motor with fixed carbon brushes and a rotating commutator in the form of copper segments attached to lead ends of the armature windings.

The brushless motor power supply conventionally includes six power transistors. At any one instance during armature rotation, only two of the six transistors are conducting. The total current flow to the motor is supported by all six transistors, and each of the transistors which are connected in series need only be selected to support one-third of the total motor current.

Brushless direct current motors are particularly useful in a textile machine, such as a take-up device as described in Benjamin, United States application Ser. No. 609,113 filed May 11, 1984; and in textile feeders because of their small size and the ability to operate such motors in hazardous environments. However, in a take-up device as described in the Benjamin application, it is necessary in operation of the device to lock the spindle driven by the motor to doff and don yarn packages. In textile feeders oftentimes a yarn strand becomes entangled which can accidentally lock-up the motor. In such machine applications of the motor which cause the motor armature to be clamped in a stall condition, the armature current flow will be concentrated through only the two transistors which are selected by the encoder for that particular armature position. The conventional control circuit will cause full current to flow through these two transistors. This will represent a demand upon these two transistors which will be three times normal requirement.

It will be readily apparent that the selection of transistors capable of receiving three times normal current requirement represents a great addition to the power supply course. It is, therefore, the object of this invention to eliminate the requirement for such high capacity transistors by implementing an alternative stategy in the control circuit design.

It is to be understood that the condition in which the motor is clamped or stalled is an undesirable or unusual machine condition. Detection of the stall condition can appropriately be utilized for purposely faulting or shutting down the operation of the power supply.

PRIMARY OBJECTS AND GENERAL DESCRIPTION OF INVENTION

In accordance with this invention there is provided a mechanism to sense a motor stall condition, to combine such signal with the information that there is a demand for motor rotation, and effect a fault shutdown to occur in the power supply.

BRIEF DESCRIPTION OF THE DRAWING

Having described the invention in general terms, specific and presently preferred embodiments will be set forth in the context of the illustrative drawings.

DESCRIPTION OF PREFERRED EMBODIMENT

Figure 1:
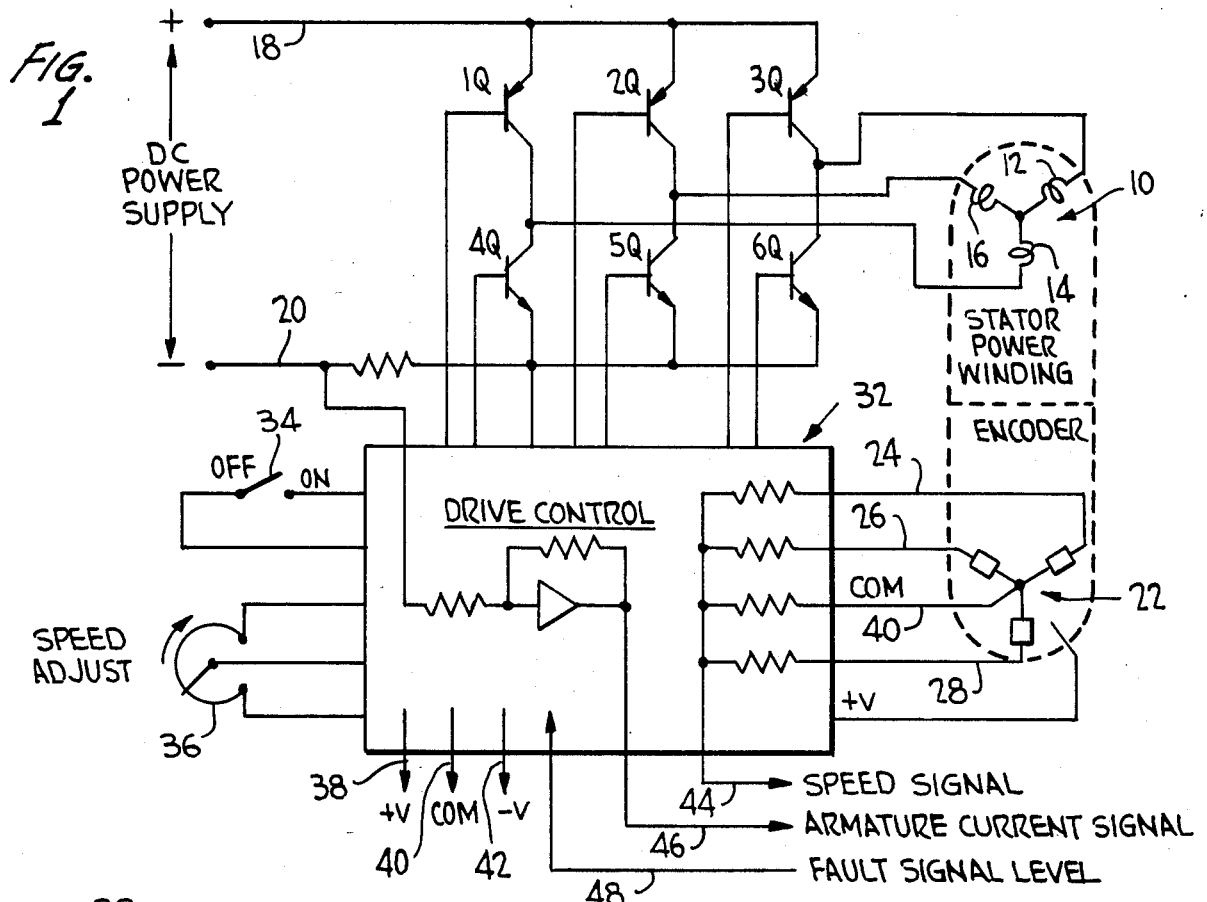
FIG. 1 is a schematic view of the power supply for a brushless direct current motor including a conventional drive control to which there are coupled leads for a stall condition fault shutdown circuit.

FIG. 1 illustrates the circuitry for a conventional brushless motor drive of the type to be provided with a stall shutdown circuit in accordance with this invention. It is to be understood that the motor will include a stator generally identified by the numeral 10 having a three-phase winding, including windings 12, 14, and 16 which are equally circumferentially spaced. There is a DC power supply for the stator 10 which includes a positive lead 18 and a negative lead 20. It will be seen that power is directed to the winding 14 from the positive lead 18 by means of a transistor 1Q and from the negative lead 20 through a transistor 4Q. In like manner, power is supplied to the winding 16 from the positive lead 18 through a transistor 2Q and from the negative lead 20 through a transistor 5Q. Finally, power is supplied to the winding 12 from the positive lead 18 through a transistor 3Q and from the negative lead 20 through the transistor 6Q.

There is coupled to the armature (not shown) for incremental rotation therewith an encoder generally identified by the numeral 22. The encoder 22 is provided with leads 24, 26, and 28 from each of the three elements thereof. There is also a common 40.

The brushless direct current electric motor is also provided with a conventional drive control which is generally identified by the numeral 32. The conventional drive controls are described in the literature, for example in *DC Motors, Speed Controls, Servo Systems, An Engineering Handbook* by Electro Craft Corp., Chapter 6, which is incorporated herein by reference. The drive control 32 is actuated in a conventional manner to sequentially turn on the sets of transistors to effect sequential pulsing of electrical energy through the coils 12, 14, and 16 so as to effect incremental armature rotation.

The sequential turn on of the transistors is 1Q-5Q, 1Q-6Q, 2Q-6Q, 2Q-4Q, 3Q-4Q, 3Q-5Q, back to 1Q-5Q, and so on.

The drive control 32 will be provided with a conventional on-off switch 34 and an adjustable speed control 36 so as to control both motor operation and motor speed.

The drive control has leading therefrom six leads. These leads, as is shown in FIG. 1, include a positive lead 38, a common 40, and a negative lead 42. The leads also include a speed signal lead 44 which is coupled through suitable resistors to the leads 24, 26, 28, and 40 of the encoder to provide a signal indicating rotation of the armature even though the speed of rotation may be very slow.

The leads also include a lead 46 which carries an armature current signal. There is also a lead 48, which is a returning lead, and which lead may have therein an output of a fault signal level.

Figure 2:
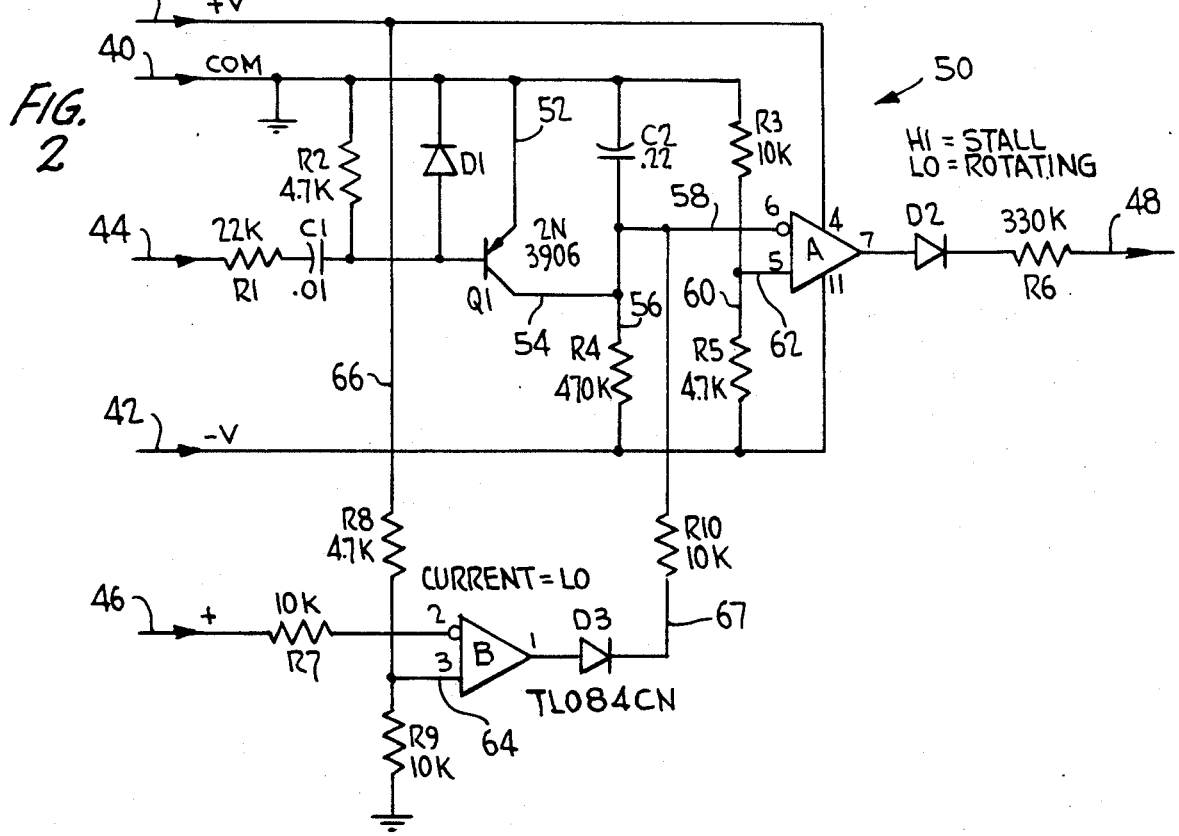
FIG. 2 is a schematic showing the details of the stall shutdown circuit which is to be connected to the leads from the drive control.

Referring now to FIG. 2, it will be seen that there is illustrated the details of one form of stall shutdown circuit which is the subject of this invention, the circuit being generally identified by the numeral 50 and being coupled to the drive control 32 through the aforementioned leads 38, 40, 42, 44, 46, and 48.

Before going into the details of the stall shutdown circuit 50, it is noted that the speed signal provided by the lead 44 is a composite of pulse signals from the motor encoder. While the individual encoder elements typically provide two cycles per motor revolution, the composite signal is three times this or six cycles per revolution.

With respect to the armature current signal, this is an amplified signal (see the drive control 32) which is proportional to the current flow of the DC power supply. The level of this signal is an indication of the torque demand of the motor. Typically, this signal will be +2.5 volts at the rated motor current.

The fault signal is an input to the drive control circuit and is a portion of the reference signal against which the fault circuit will respond to excessive motor currents.

The supply power through the leads 38, 40 and 42 is provided for excitation of the stall shutdown circuit and typically includes a +7 volt DC and a −7 volt DC supply.

The speed signal enters the circuit 50 through lead 44 and feeds through a resistor R1 and a capacitor C1 arranged in series and develops a differentiated signal across resistor R2 which is connected between the speed signal lead 44 and the common lead 40.

There is also coupled between the speed signal lead 44 and the common lead 40 parallel to the resistor R2 a diode D1.

It is also noted that the differentiated signal across the resistor R2 is an important feature of the stall shutdown circuit 50 for it is only in this manner that a sense of motor rotation is transmitted to the remainder of the circuit.

The differentiated signal feeds into the base of a transistor Q1. The transistor Q1 is also coupled to the common 40 by a lead 52 and through a lead 54 to a lead 56 which extends between the negative voltage lead 42 and the common 40. The lead 56 has coupled therein in series a capacitor C2 and a resistor R4. A further lead 58 extends from the lead 56 intermediate the capacitor C2 and the resistor R4 to one pin of an amplifier A.

A terminal portion of the common 40, identified by the numeral 60, is coupled to the negative lead 42 and has incorporated therein a resistor R3 and a resistor R5. A lead 62 extends between the portion 60 and the common between the resistors R3 and R5, and is coupled to the amplifier as shown in FIG. 2.

Further, the positive voltage lead 38 and the negative voltage lead 42 are also coupled to the amplifier A in the manner shown.

It is to be understood that the negative differentiated pulses from the speed signal momentarily turn on the transistor Q1 discharging the capacitor C2 through the transistor Q1 collector to emitter.

It is further noted that the amplifier A is biased by a negative voltage input into pin 5, this bias being developed by the resistors R3 and R5. The negative voltage bias will cause the amplifier output to swing negative or "LO".

As previously described, the other input to the amplifier A is to pin 6 and is obtained from the capacitor C2 and the resistor R4 junction. If capacitor C2 is allowed to charge to full voltage from the negative voltage supply through the resistor R4, the input to pin 6 would exceed the level at pin 5 and cause the amplifier A output to swing positive or "HI". However, the speed signal is repeatedly turning on the transistor Q1 and discharging the capacitor C2, and it is only when the motor is at rest or zero speed that the capacitor C2 is permitted to charge.

From the foregoing it will be apparent that the positive or "HI" output of the amplifier A is, therefore, a basic indication that the motor is at rest or stall. The time constant of resistor R4 and capacitor C2 is selected so that a very low speed of operation will indicate a rotating condition for the motor.

It will be seen that the output of the amplifier A is through the lead 48 by way of a diode D2 and a resistor R6 back to the drive control circuit 32 so that when there is a positive fault signal level, a power supply to the motor will open and automatic fault shutdown will occur.

It will be apparent from the foregoing that the so described portion of the stall shutdown circuit 50 will assure fault shutdown in the event of a motor stall. However, the motor may not be startable in a normal manner from an "at rest" condition with only this portion of the stall shutdown circuit 50. It is only when the motor current and, therefore, transistor currents reach excessive levels that the logic information that the motor is stalled need be permitted to interact with the drive control circuit 32.

Accordingly, there is provided an amplifier B to enable or dis-able the stall signal amplifier A. With a signal input from the armature current signal through lead 46 at terminal 2, the amplifier B will be normally positive or "HI" and will swing to negative or "LO" when the armature current exceeds normal level. This action is obtained by a positive bias signal into pin 3 of the amplifier B.

At this time it is noted that the armature current signal passes into the pin 2 of the amplifier B from the lead 46 through resistor R7. It is also pointed out that a lead 64 which is coupled to the pin 3 of amplifier B is coupled to a lead 66 between the positive voltage lead 38 and ground between resistors R8 and R9 incorporated in the lead 66 in series.

Amplifier B has an output lead 67 which is coupled to the pin 6 amplifier A through lead 58. The output of amplifier B passes through a diode D3 and a resistor R10.

When amplifier B is positive under low current conditions, the stall indicating circuit is dis-abled by forcing amplifier A to a "LO" condition or negative condition. When the armature current level exceeds the normal threshold, amplifier B output swings to "LO" and diode D3 blocks its effect upon the circuit of amplifier A and the stall indication is enabled.

Returning once again to the output of amplifier A, it is to be understood that diode D2 will only pass a signal of a positive level which is indicative of stall condition. This signal, when applied to the drive control circuit 32, modifies the calibration of the reference level of the fault shutdown circuit. By reducing the level of "FAULT TRIP," the circuit is caused to shut down before damage occurs to the power transistors 1Q-6Q.

Figure 3:
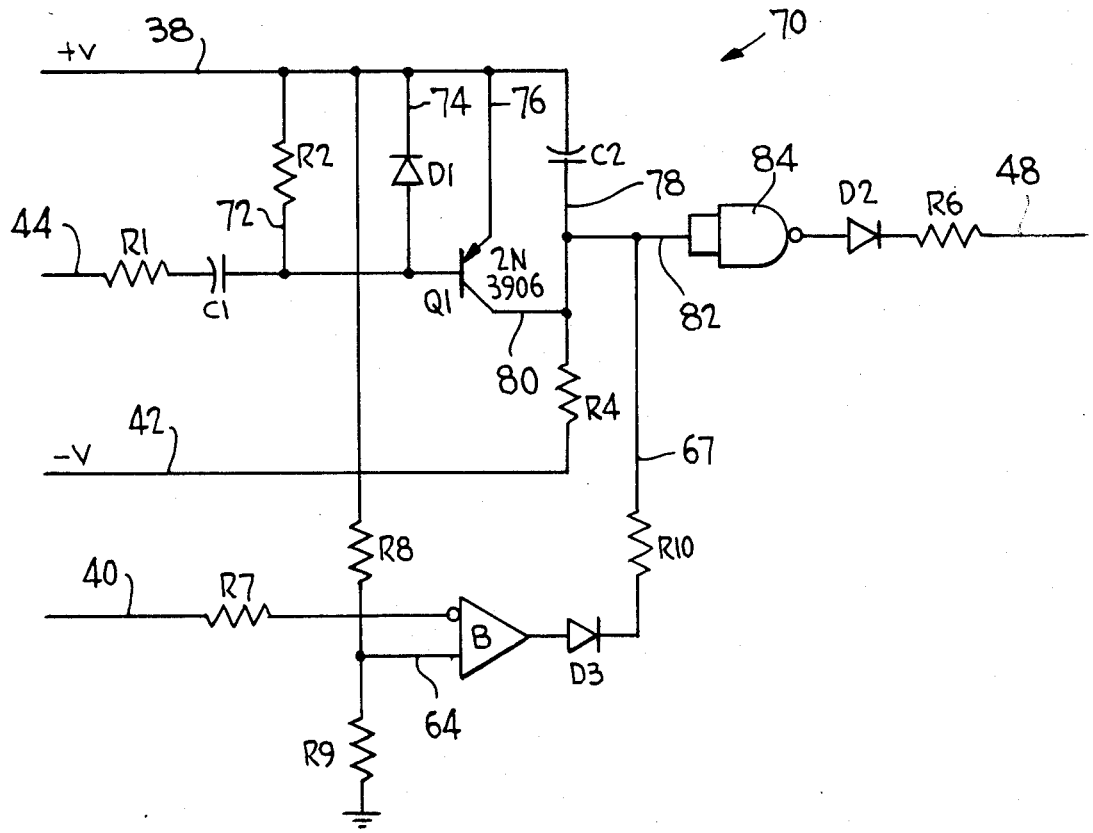
FIG. 3 is a schematic showing, in part, another stall shutdown circuit.

It is to be understood that other circuit configurations may be utilized to provide the same function. For example, a CMOS NAND circuit element may be utilized to perform the same function as amplifier A as is shown in FIG. 3. This control circuit is generally identified by the numeral 70 and includes the transistor Q1 to which the speed signal lead 44 is connected in the manner of the circuit 50 through the resistor R1 and the capacitor C1. On the other hand, in lieu of the connections being primarily with the common 40, resistor R2 is in a lead 72 between the positive voltage lead 38 and the speed signal lead 44. In a like manner, the diode D1 is in a lead 74 which is also between the positive voltage lead 38 and the speed signal lead 44. In addition, in lieu of the lead 52, a lead 76 connects the transistor Q1 to the positive voltage lead 38.

Finally, and most particularly, in lieu of the common being connected by a lead portion to the negative voltage lead, a lead portion 78 couples the positive voltage lead 38 to the negative voltage lead 42, and the capacitor C2 and the resistor R4 are incorporated therein. A lead 80 couples the lead 78 at the juncture of the capacitor C2 and the resistor R4 to the transistor Q1 as shown. A further lead 82 extends from the juncture of the capacitor C2 and the resistor R4 to the NAND circuit element, identified by the numeral 84. The lead 48 is connected to the output of the NAND circuit element 84 and has incorporated therein the diode D2 and the resistor R6. The lead from the output of the amplifier B is coupled to the lead 82 so that the output of the transistor B may override the input from the speed signal.

It is to be understood that the control circuit 70 operates in generally the same manner as the aforedescribed controller circuit 50.

It is also pointed out that while in the present control circuits a positive signal acts to reduce the level of "FAULT TRIP," future drive control circuits may be such that a negative signal will be required to reduce the trip level. In this event, the control circuit will be configurated to produce a negative output signal for a stall condition.

As will be apparent to one skilled in the art, various modifications can be made within the scope of the aforesaid description. Such modifications being within the ability of one skilled in the art form a part of the present invention and are embraced by the appended claims.

It is claimed:

1. In combination with a brushless direct current motor of the type including an armature and stator windings and wherein said motor has a power supply including transistors for pulsing the power supply to said stator windings, a stall protector circuit coupled to said motor for detecting armature stall and then opening said power supply to said motor before full power is directed to those of said transistors associated with one only of said stator winding, said stall protector circuit including an encoder coupled to said armature for rotation thereby and for producing a speed signal to indicate a dynamic rotating condition, and further including an amplifier having as inputs a first bias having a negative voltage and a second bias normally having a positive voltage less than said negative voltage wherein said amplifier normally has a negative output indicating armature rotation.

2. In the combination of claim 1, means for disabling said stall protector circuit at the time of motor starting.

3. In the combination of claim 1, said power supply including a negative voltage and said power supply negative voltage being said negative voltage of said first bias, and said second bias being controlled by said speed signal.

4. In the combination of claim 3, said second bias being provided by a circuit including a capacitor chargeable by said power supply, there is a transistor coupled to said capacitor for repeatedly discharging said capacitor, and said transistor being repeatedly actuated by said speed signal whereby when said speed signal cannot activate said transistor said capacitor becomes fully charged and said second bias becomes positive and exceeds said first bias and the output of said amplifier becomes positive to provide a stall signal for shutting off said power supply.

5. The combination of claim 4 wherein said speed signal is coupled to said transistor via a differentiated pulsed signal that provides a sense of armature rotation to repeatedly turn said transistor.

6. In the combination of claim 1, including means for disabling said stall protector circuit at the time of motor starting.

7. In the combination of claim 6, said means for disabling said stall protector circuit at the time of motor starting being controlled by an armature current signal.

8. In the combination of claim 6, said means for disabling said stall protector circuit at the time of motor starting being controlled by a starting amplifier having a positive voltage bias from a positive voltage of said power supply and a negative voltage form said armature current signal, and said armature current signal at the time of motor start being greater than said positive voltage bias to provide a negative output from said starting amplifier, said output of said starting amplifier being coupled to said second bias to render said second bias voltage negative to render said second bias positive voltage less than said first bias negative voltage.

9. In combination with a brushless direct current motor of the type including an armature and stator windings and wherein said motor has a power supply including transistors for pulsing the power supply to said stator windings, a stall protector circuit coupled to said motor for detecting armature stall and then opening said power supply to said motor before full power is directed to those of said transistors associated with one only of said stator winding, said stall protector circuit including an encoder coupled to said armature for rotation thereby and for producing a speed signal to indicate a dynamic rotating condition, and further including a biased control component normally having a negative voltage bias controlled by said speed signal with said bias becoming positive in the absence of a speed signal indicating armature rotation to effect said opening of said power supply.

10. In the combination of claim 9, said second bias is provided by a circuit including a capacitor chargeable by said power supply, there is a transistor coupled to said capacitor for repeatedly discharging said capacitor, and said transistor being repeatedly actuated by said speed signal whereby when said speed signal cannot activate said transistor said capacitor becomes fully charged and said bias voltage becomes positive.

11. In the combination of claim 10, said bias voltage is directed to an input of a NAND circuit element.

12. In the combination of claim 10, including means for disabling said stall protector circuit at the time of motor starting being controlled by a starting amplifier having a positive voltage bias from a positive voltage of said power supply and a negative voltage from said armature current signal, and said armature current signal at the time of motor start being greater than said positive voltage bias to provide a negative output from said starting amplifier, said output of said starting amplifier being coupled to said biased control component for overriding said positive voltage bias.

13. In the combination of claim 9, including means for disabling said stall protector circuit at the time of motor starting.

14. In the combination of claim 13, said means for disabling said stall protector circuit at the time of motor starting being controlled by an armature current signal.

15. In a textile machine of the type which includes means for winding fiber and yarn on spools and tubes, said textile machine comprising a rotating spindle for receiving spools and tubes, and an electric motor coupled to said spindle for rotating said spindle characterized in that said electric motor is a brushless direct current motor of the type including an armature and stator windings and wherein said motor has a power supply including transistors for pulsing the power supply to said stator windings, a stall protector circuit coupled to said motor for detecting armature stall and then opening said power supply to said motor before full power is directed to those of said transistors associated with one only of said stator winding, said stall protector circuit including an encoder coupled to said armature for rotation thereby and for producing a speed signal to indicate a dynamic rotating condition, and further including an amplifier having as inputs a first bias having a negative voltage and a second bias normally having a positive voltage less than said negative voltage wherein said amplifier normally has a negative output indicating armature rotation.

16. The machine of claim 15, further including means for disabling said stall protector circuit at the time of motor starting.

17. The machine of claim 15, wherein said power supply including a negative voltage and said power supply negative voltage being said negative voltage of said first bias, and said second bias being controlled by said speed signal.

18. The machine of claim 17, wherein said second bias being provided by a circuit including a capacitor chargeable by said power supply, there is a transistor coupled to said capacitor for repeatedly discharging said capacitor, and said transistor being repeatedly actuated by said speed signal whereby when said speed signal cannot activate said transistor said capacitor becomes fully charged and said second bias becomes positive and exceeds said first bias and the output of said amplifier becomes positive to provide a stall signal for shutting off said power supply.

19. The machine of claim 18, wherein said speed signal is coupled to said transistor via a differentiated pulsed signal that provides a sense of armature rotation to repeatedly turn said transistor.

20. The machine of claim 15 further including means for disabling said stall protector circuit at the time of motor starting.

21. The machine of claim 20, wherein said means for disabling said stall protector circuit at the time of motor starting being controlled by an armature current signal.

22. The machine of claim 20, wherein said means for disabling said stall protector circuit at the time of motor starting being controlled by a starting amplifier having a positive voltage bias from a positive voltage of said power supply and a negative voltage from said armature current signal, and said armature current signal at the time of motor start being greater than said positive voltage bias to provide a negative output from said starting amplifier, said output of said starting amplifier being coupled to said second bias to render said second bias voltage negative to render said second bias positive voltage less than said first bias negative voltage.

23. In a textile machine of the type which includes means for winding fiber and yarn on spools and tubes, said textile machine comprising a rotating spindle for receiving spools and tubes, and an electric motor coupled to said spindle for rotating said spindle characterized in that said electric motor is a brushless direct current motor of the type including an armature and stator windings and wherein said motor has a power supply including transistors for pulsing the power supply to said stator windings, a stall protector circuit coupled to said motor for detecting armature stall and then opening said power supply to said motor before full power is directed to those of said transistors associated with one only of said stator winding, said stall protector circuit including an encoder coupled to said armature for rotation thereby and for producing a speed signal to indicate a dynamic rotating condition, and further including a biased control component normally having a negative voltage bias controlled by said speed signal with said bias becoming positive in the absence of a speed signal indicating armature rotation to effect said opening of said power supply.

24. The machine of claim 23, wherein a second bias is provided by a circuit including a capacitor chargeable by said power supply, there is a transistor coupled to said capacitor for repeatedly discharging said capacitor, and said transistor being repeatedly actuated by said speed signal whereby when said speed signal cannot activate said transistor said capacitor becomes fully charged and said bias voltage becomes positive.

25. The machine of claim 24, wherein said bias voltage is directed to an input of a NAND circuit element.

26. The machine of claim 24, wherein said means for disabling said stall protector circuit at the time of motor starting being controlled by a starting amplifier having a positive voltage bias from a positive voltage of said power supply and a negative voltage from said armature current signal, and said armature current signal at the time of motor start being greater than said positive voltage bias to provide a negative output from said starting amplifier, said output of said starting amplifier being coupled to said biased control component for overriding said positive bias voltage.

27. The machine of claim 23 further including means for disabling said stall protector circuit at the time of motor starting.

28. The machine of claim 27, wherein said means for disabling said stall protector circuit at the time of motor starting being controlled by an armature current signal.

* * * * *